(12) United States Patent
Mohamed (10) Patent No.: US 8,549,278 B2
(45) Date of Patent: Oct. 1, 2013

(54) RIGHTS MANAGEMENT SERVICES-BASED FILE ENCRYPTION SYSTEM AND METHOD

(75) Inventor: Ahmed Mohamed, Sammamish, WA (US)

(73) Assignee: Blackout, Inc., Sammamish, WA (US)

( * ) Notice: Subject to any disclaimer, the term of this patent is extended or adjusted under 35 U.S.C. 154(b) by 985 days.

(21) Appl. No.: 12/202,027

(22) Filed: Aug. 29, 2008

(65) Prior Publication Data
US 2009/0106552 A1  Apr. 23, 2009

Related U.S. Application Data

(63) Continuation-in-part of application No. 12/182,948, filed on Jul. 30, 2008.

(60) Provisional application No. 60/981,490, filed on Oct. 20, 2007, provisional application No. 60/981,493, filed on Oct. 20, 2007.

(51) Int. Cl.
*H04L 9/00* (2006.01)

(52) U.S. Cl.
USPC ............ 713/150; 713/165; 713/185; 380/255

(58) Field of Classification Search
USPC .......................... 713/165, 150, 185; 380/255
See application file for complete search history.

(56) References Cited

U.S. PATENT DOCUMENTS

| | | | | |
|---|---|---|---|---|
| 6,754,827 B1 | 6/2004 | Cane et al. | | 713/193 |
| 7,280,956 B2 | 10/2007 | Cross et al. | | 713/171 |
| 7,428,751 B2 | 9/2008 | Oom Temudo de Castro et al. | | 726/10 |
| 7,454,612 B2 | 11/2008 | Bolosky et al. | | 713/168 |
| 7,770,206 B2 | 8/2010 | Dillaway et al. | | 726/2 |
| 2004/0111608 A1 | 6/2004 | Oom Temudo de Castro et al. | | |
| 2005/0097313 A1* | 5/2005 | Bolosky et al. | | 713/150 |
| 2005/0097318 A1 | 5/2005 | Bolosky et al. | | |
| 2007/0033400 A1 | 2/2007 | Senez | | |
| 2007/0067620 A1 | 3/2007 | Jevans | | |
| 2007/0263868 A1* | 11/2007 | Youn et al. | | 380/255 |
| 2007/0283443 A1 | 12/2007 | McPherson et al. | | 726/1 |
| 2008/0209225 A1* | 8/2008 | Lord et al. | | 713/185 |

* cited by examiner

*Primary Examiner* — Kambiz Zand
*Assistant Examiner* — Shiuh-Huei Ku
(74) *Attorney, Agent, or Firm* — Knobbe, Martens, Olson & Bear, LLP (57) ABSTRACT

Windows Rights Management Services (RMS) are leveraged to provide protection and sharing of encryption keys to file systems. An encrypting file system (EFS) delegates key sharing, management and recovery to the RMS system. User rights to file encryption keys (FEKs) are derived from files' security descriptor information or as explicitly specified by users. Whenever an encrypted file is created, its FEK is protected using RMS, as a byte stream stored in file encryption metadata information. When a user with access tries to access an encrypted file without having a private key to decrypt the FEK, the EFS transparently extracts the RMS protected byte stream from the file encryption metadata information and uses RMS to access the FEK stored in the bytes stream using the user security context. The FEK is protected with the user master key, encryption certificate or password and cached for the next user file access.

24 Claims, 6 Drawing Sheets

RIGHTS MANAGEMENT SERVICES-BASED FILE ENCRYPTION SYSTEM AND METHOD

RELATED APPLICATIONS

This application is based on a prior copending provisional application, Ser. No. 60/981,490, filed on Oct. 20, 2007, and on a prior copending provisional patent application, Ser. No. 60/981,493, also filed on Oct. 20, 2007, the benefit of the filing date of which is hereby claimed under 35 U.S.C. §119 (e). This application is also a continuation-in-part of a copending patent application Ser. No. 12/182,948, filed on Jul. 30, 2008, the benefit of the filing date of which is hereby claimed under 35 U.S.C. §120.

BACKGROUND

Microsoft Corporation's prior art WINDOWS™ operating systems include built-in support for transparent file level encryption and decryption for volumes that are formatted with Microsoft Corporation's New Technology File System (NTFS). This feature, which is referred to as an encrypting file system (EFS), provides transparent encryption and decryption of files. A given folder can be marked as encrypted, and files created in the folder can be encrypted without any user intervention. WINDOWS™ EFS uses a symmetric file encryption key (FEK) for each file to encrypt and decrypt the file data. The FEK is encrypted with each user encryption public key and stored in the file EFS metadata information.

One of the key challenges in file encryption systems is providing key management to protect against lost keys and enable sharing of encrypted files among users. Rights Management Services (RMS), which is also included in the WINDOWS™ operating systems, supports such functionality and identity-based sharing of protected documents. Its identity-based model enables users to specify email addresses and user names to specify a set of users who have access to a protected document.

Further, the RMS module eliminates the need for users to share passwords or certificates, in order to share RMS protected files. However, it is important to understand that RMS is limited to specific applications and is not directly integrated into the general operating system file management system. Accordingly, it has only been available for use in the past with those specific applications and has not generally been used for facilitating access to general files. There is no suggestion in the prior art about integrating the RMS functionality with EFS, although, once the details for doing so are made clear, there are clear advantages for such a combination.

Clearly, it would be desirable to enable the RMS functionality to be used for protecting EFS keys, and to enable users to access encrypted files from multiple computers without having to provide for roaming of the EFS encryption certificates or manually copying certificate private keys between computers. This approach could also be employed to enable users to self-recover EFS encrypted files, even if an encryption certificate private key is lost.

SUMMARY

Accordingly, an exemplary novel method has been developed for managing access to an encrypted file. In response to a request to encrypt a file that includes information intended to be protected against unauthorized access, the file is encrypted with a file encryption key, producing an encrypted file. The file encryption key and an indication of one or more entities having a right to access the file encryption key are then provided to rights management services that are included in an operating system, e.g., in a Microsoft WINDOWS™ operating system. As used herein and in the claims that follow, the term "one or more entities" is intended to encompass one or more users and/or one or more groups, as well as other definable classes of users employed on a network or system. The rights management services are used for cryptographically securing the file encryption key, producing a secured file encryption key. Next, the secured file encryption key is included in a file structure of the encrypted file. Subsequently, in response to an entity trying to access the information in the encrypted file, the method provides for determining if the entity is included in the one or more entities that have a right to access the file encryption key. If so, the file encryption key is extracted from the secured file encryption key and is provided so as to enable the entity trying to access the information to do so. However, if the entity is not authorized to access the file encryption key, the method provides for denying the entity access to the information, by not providing the file encryption key to enable the entity to access the information.

In an exemplary embodiment, an encrypting file system carries out the steps of generating the file encryption key and encrypting the file with the file encryption key. The encrypting file system also carries out the step of using the file encryption key to decrypt the file to enable the entity attempting to access the information to do so.

The step of providing the rights management services with the indication of the one or more entities having the right to access the file encryption key can include the step of providing that indication as part of a file security descriptor. Alternatively, the rights management services can be provided with an access control list that identifies each entity having the right to access the file encryption key.

The step of including the secured file encryption key in a file structure of the encrypted file can comprise the step of including the secured file encryption key as part of metadata information for the encrypted file.

In at least some exemplary embodiments, a software application can provide the request to encrypt the information.

The method can further include the step of employing a protected key service for providing the file encryption key to the rights management services to produce the secured file encryption key.

Another step that can be implemented in the method, after the entity has been determined to be allowed access to the information by the rights management services, is caching the file encryption key for the entity attempting to access the information, so that the entity can subsequently access the information in the encrypted file.

The step of responding to the entity trying to access the information can include the step of intercepting an open file request by the entity, to open the encrypted file.

Other steps of the method can include writing the file encryption key into a memory buffer, and protecting the memory buffer with the rights management services using a file security descriptor.

The secured file encryption key can also be included in the encrypted file as an extended attribute, or as a special data stream provided by the rights management services.

Another aspect of the present approach is directed to an exemplary system for managing access to an encrypted file in accord with the present novel approach. The system includes a memory in which are stored machine executable instructions, and a processor that is coupled to the memory. The processor executes the machine instructions to carry out a plurality of functions that are generally consistent with the steps of the method discussed above.

This application specifically incorporates by reference the disclosures and drawings of the provisional and conventional patent applications and any issued patent identified above as a related application.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive. No limitation on the scope of the technology and of the claims that follow is to be imputed to the examples shown in the drawings and discussed herein.

The present novel approach was developed to provide a new rights management services-based file encryption system that will leverage Microsoft Corporation's WINDOWS™ Rights Management Services (RMS) to provide protection and sharing of encryption keys to file systems. This approach is also expected to provide a new rights management services-based file encryption system that has many novel features not offered by prior art applications or technology.

An exemplary embodiment of this novel approach is implemented using computer programming code to carry out a method and process that leverages WINDOWS™ RMS to provide protection and sharing of encryption keys to file systems. RMS is ideal for this purpose because it enables users to share protected content without having to exchange encryption certificates or passwords.

Using the exemplary method and process disclosed herein, any Encrypting File System (EFS) can be extended to protect its file encryption keys (FEKs) and assign user access rights to encrypted files by employing the functionality of RMS. This approach enables the EFS to delegate key sharing, management, and recovery to the RMS system. In this approach, user rights to FEKs are derived from file security descriptor information, or as explicitly specified by users. Whenever an encrypted file is created, its FEK is protected using RMS, and the resulting byte stream is stored in the file encryption metadata information for the encrypted file. When a user tries to access an encrypted file and doesn't have the private key needed to decrypt the FEK stored in the metadata, the EFS transparently extracts the RMS-protected byte stream from the file encryption metadata information. The EFS then uses RMS to try to obtain access to the FEK that is stored in the byte stream, using the current user security context. If the user attempting to access the encrypted file is authorized access and the FEK is successfully obtained, then the EFS is able to decrypt the file data, and the user is granted access to that data. The FEK is protected by the user master key or password and cached in the system protected non-page memory. This approach enables the system to reuse the FEK for the current user on the next file access, which avoids repeating the steps described above each time the data in the encrypted file must be accessed by the current user. If the user doesn't hold rights to extract the FEK, then the user is denied access.

Figure 1:
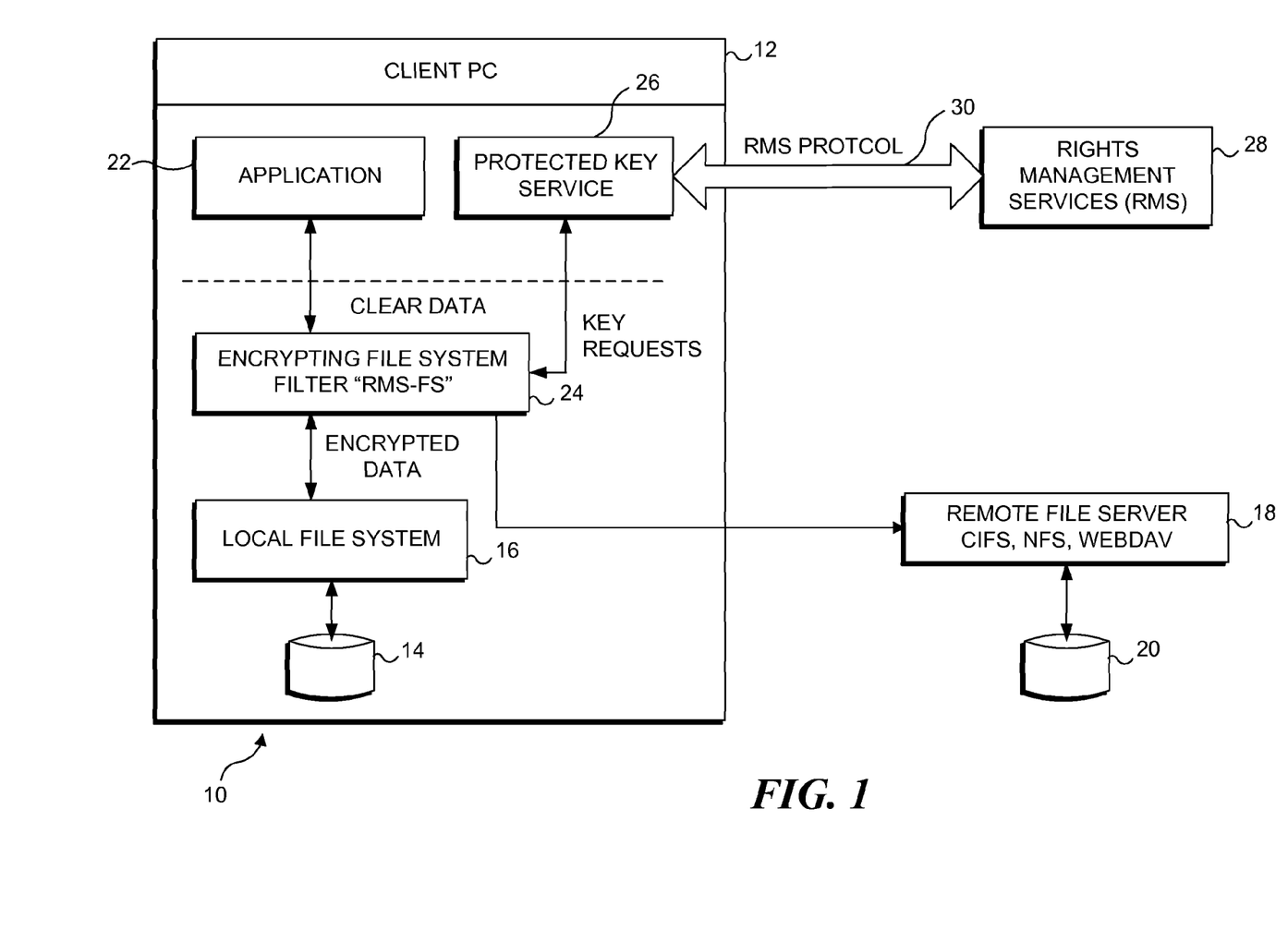
FIG. 1 shows a diagram illustrating a file system encryption filter that uses a RMS-aware and protected key service for protecting and managing its file encryption keys. User data is stored encrypted in local or remote file system.

An overall system architecture 10 is illustrated in FIG. 1, in connection with a client personal computer (PC) 12 having a local storage 14 that is coupled to a local file system 16. The data of the user that is to be protected can be stored on local storage 14, or alternatively, may be stored on a remote storage 20 that is controlled by a remote file server 18. Client PC 12 can communicate with remote file server 18 using the common Internet file system (CIFS) protocol, the network file system (NFS) protocol, or the web-based distributed authoring and versioning (WebDAV) extensions to the hypertext transfer protocol (HTTP). A rights management system encrypting file system (RMS-FS) filter 24 intercepts user local and remote file system creation/access of the encrypted file by an application 22 and encrypts and decrypts file data as the data flow through the file system stack. More specifically, the EFS creates, for each file being encrypted, a symmetric encryption key that is used to both encrypt and decrypt the user file data. The symmetric encryption key is secured by RMS 28 using an RMS protocol 30 and stored inside a RMS protected document as part of the file structure of the document, as discussed in greater detail below.

Figure 2:
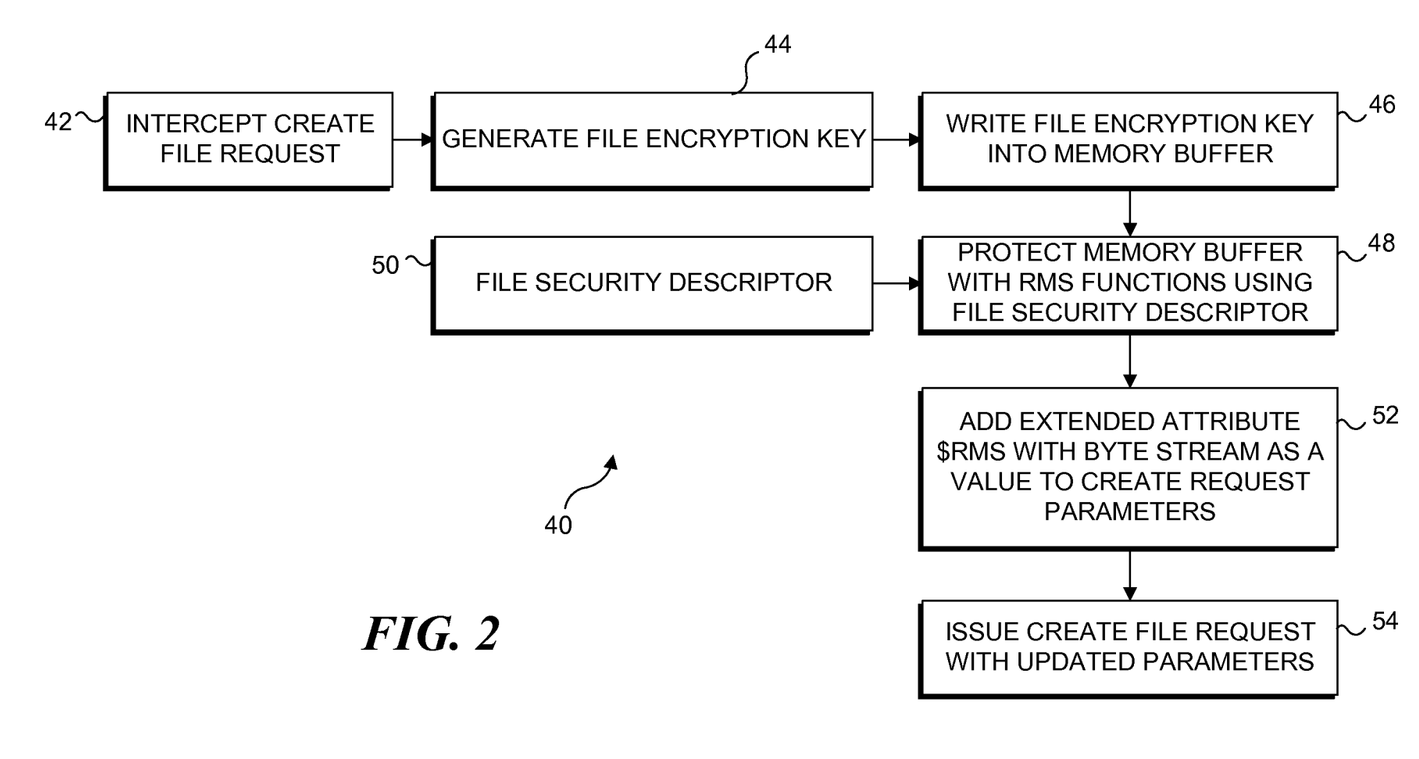
FIG. 2 is a diagram pertaining to a Rights Management Services-based File Encryption System according to the present invention, illustrating steps to create a new encrypted file, and its file encryption key is protected by the RMS.

FIG. 2 illustrates details of exemplary logical steps 40 that are implemented by system 10 (FIG. 1) when creating a file using the present novel approach. When a request to create a new file is issued by application 22, RMS-FS filter 24 intercepts the request as indicated in a step 42. The RMS-FS filter captures file security information from the create request and sends the file security information in a request to a Protected Key Service 26, which causes the service to generate a new symmetric encryption key, as indicated in a step 44. After the Protected Key Service generates the new symmetric encryption key, it writes the key to a RMS protected memory buffer or stub-file, as indicated in a step 46, applying the file security information access rights (i.e., the file security descriptor) to the protected content. A block 50 indicates how the file security descriptor is provided to protect the memory buffer with the RMS functions in a step 48.

The RMS protected content and FEK are returned to the RMS-FS filter by Protected Key Service 26. The RMS-FS filter augments the create request with an extended attribute $RMS that is added to the byte stream as a value to create the request parameters in a step 52. A step 54 indicates a create folder request is issued with the updated request parameters. The RMS-FS filter provides the protected content as the value of $RMS. The create request is then issued to the underlying file system, i.e., either local file system 16, or remote file server 18. The FEK is maintained for the current user in a file object data structure so that it can be used to encrypt and decrypt file data.

Figure 3:
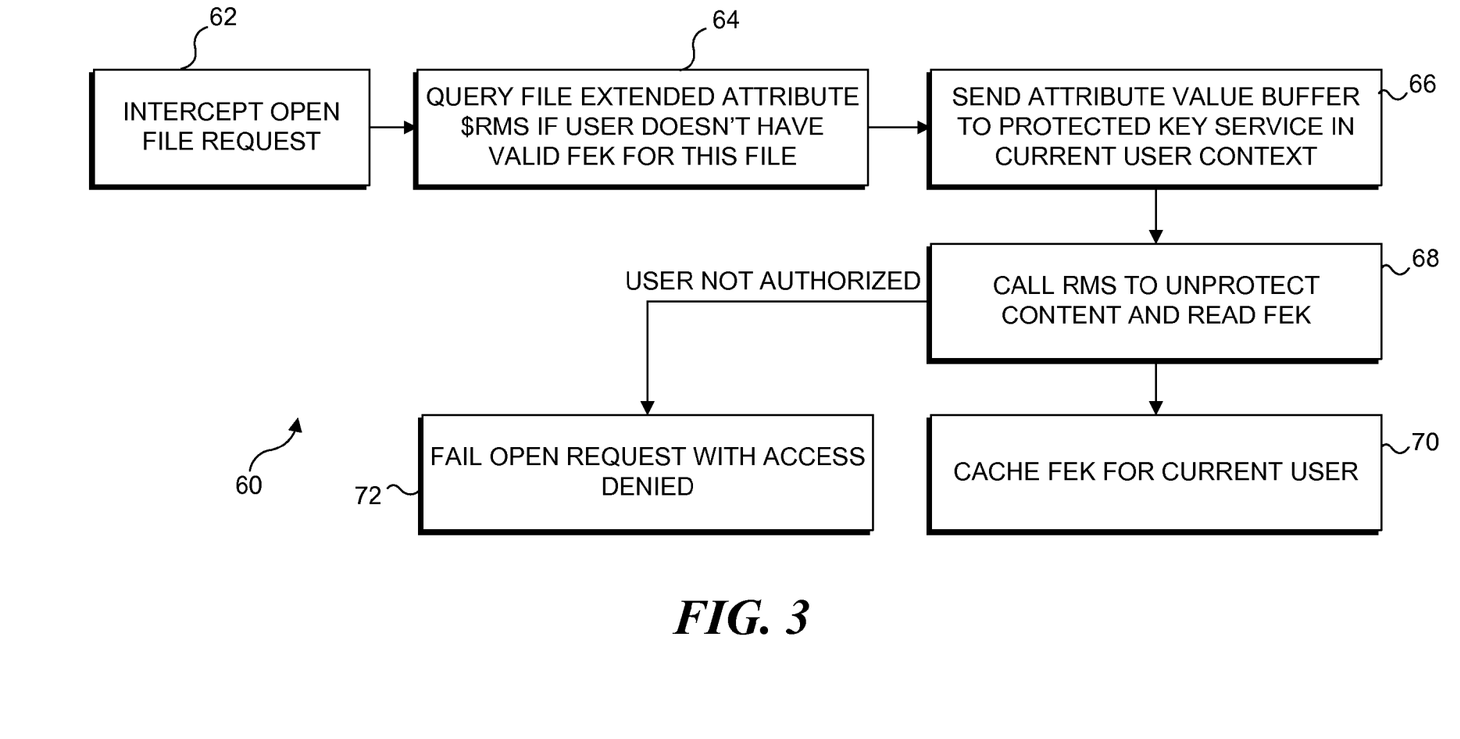
FIG. 3 is a diagram pertaining to a Rights Management Services-based File Encryption System according to the present invention, and illustrates the steps to open an existing encrypted file and then to obtain the file encryption key for the user.

As shown in exemplary logical steps 60 in FIG. 3, when a user attempts to open a file protected by the RMS-FS filter, the open call is intercepted in a step 62 and checked to determine whether the current user has a valid encryption key for the file. If the user does not have an encryption key for the file, the RMS-FS filter reads the $RMS extended attribute value from the encrypted file in a step 64 and sends a request that includes the attribute value buffer to the Protected Key Service in a step 66. A step 68 thus provides for sending a call to the RMS to extract the FEK, along with the byte stream attribute value. The attribute value contains the RMS protected byte stream that holds the FEK. The Protected Key Service uses the standard RMS APIs to unprotect the byte stream and reads the FEK under the current user security context. If the user is granted access to the FEK, the key is returned to the RMS-FS filter, which caches it for the user in a step 70. If the user is not authorized to access the FEK, the RMS-FS filter fails the open request with access denied in a step 72.

Figure 4:
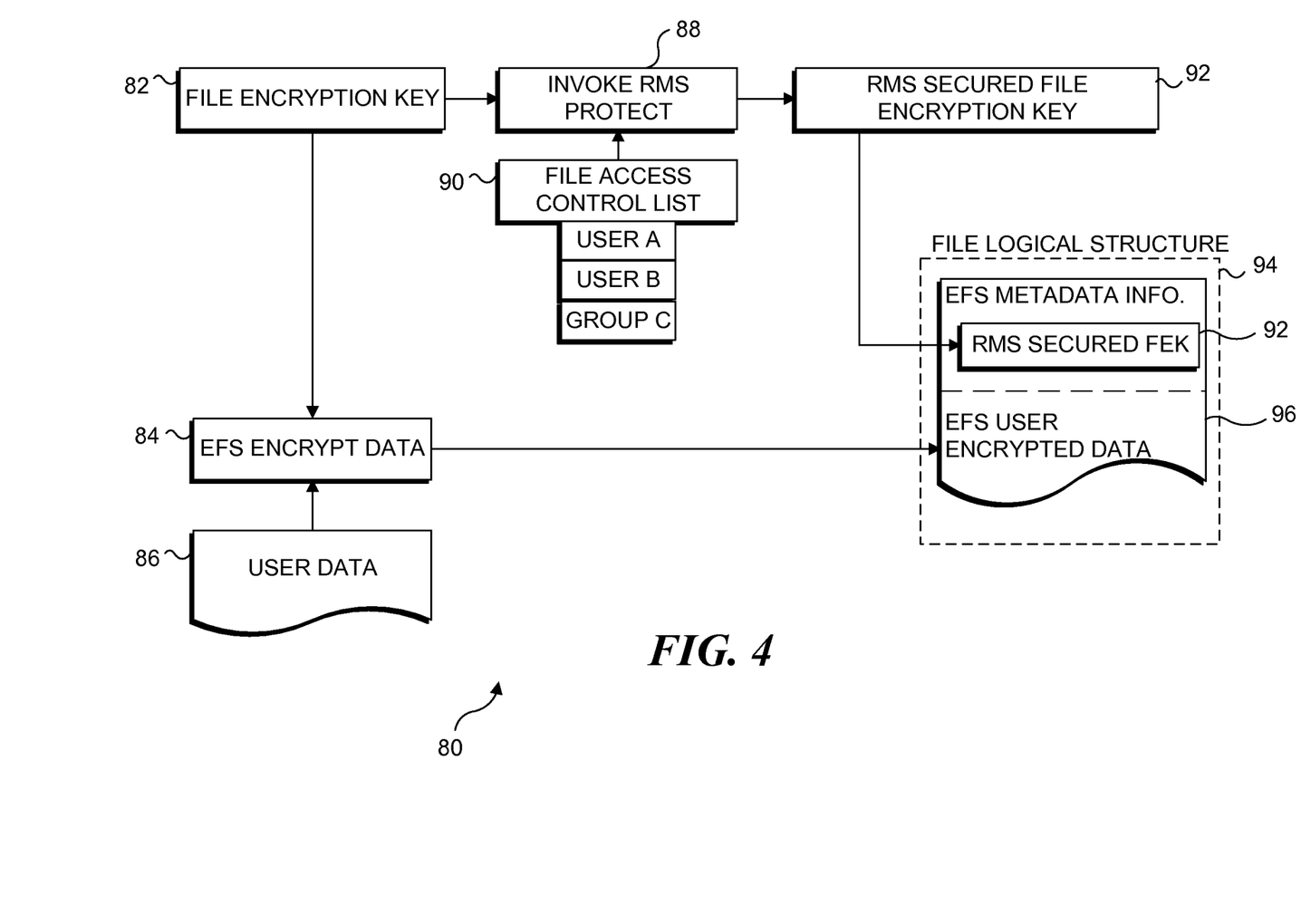
FIG. 4 is a diagram pertaining to a Rights Management Services-based File Encryption System according to the present invention that shows the data being encrypted by the WINDOWS™ encrypting file system (EFS) using the file encryption key (FEK) being secured by the RMS, and showing the secured FEK being stored in the file encryption metadata section of the protected file.

Further details of the process for using the RMS to handle the management of user access to encrypted files are illustrated in FIG. 4. In a functional block diagram 80 of this Figure, a FEK 82 is generated or otherwise provided and is supplied to the EFS in a block 84 for use in encrypting sensitive user data that were provided from a block 86. The results of the encryption process are EFS user encrypted data 96, which are a main component of a file logical structure 94 for the encrypted file. The FEK is also supplied to a block 88 to invoke an RMS protect. The RMS protect is further provided a file access control list (ACL) 90, which in this example, includes Users A, and B, and a Group C, thereby identifying entities authorized to access the sensitive data in the encrypted file. The RMS uses the FEK and the file ACL to produce a RMS secured FEK 92 that is then added to the encrypted file system metadata in file logical structure 94 of the encrypted file.

Figure 5:
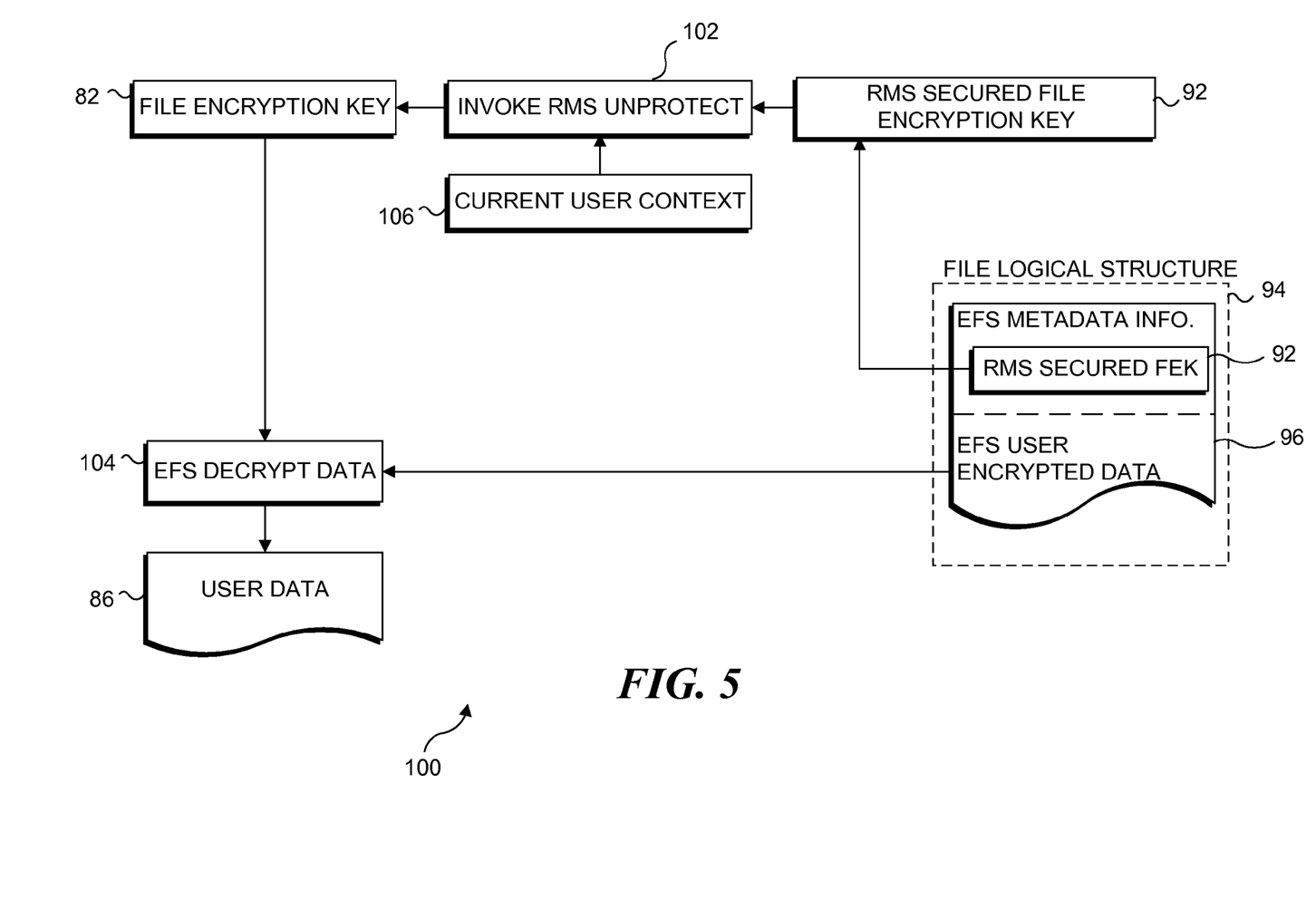
FIG. 5 is a diagram pertaining to a Rights Management Services-based File Encryption System according to the present invention showing a user accessing an encrypted file, the Windows encrypting file system (EFS) extracting the RMS secured FEK from the file encryption metadata, the encrypting file system calling into the RMS under current user content to obtain the FEK, and the FEK being used to decrypt file data.

Similarly, further details of the process used in the current novel approach to enable an authorized user to access the sensitive data in an encrypted file are shown in a functional block diagram 100 in FIG. 5. As noted above, file logical structure 94 of the encrypted file includes EFS user encrypted data 96 as the main component, and includes RMS secured FEK 92 in the EFS metadata information for the encrypted file. Accordingly, RMS secured FEK 92 is extracted from the EFS metadata information and used for invoking RMS to unprotect the FEK in a step 102. Before the RMS provides the current user access to the FEK, the RMS check a current user context 106, to determine if the current user is among a member of a group included in the file ACL that was part of RMS secured FEK 92. If so, RMS produce FEK 82, which is used by the EFS in a block 104 to decrypt sensitive user data 86 from the EFS user encrypted data in the encrypted file.

An alternative system for sharing WINDOWS™ EFS encrypted files is to leverage the RMS functionality. The RMS enables applications to define user access rights and bind those access rights to protected documents, i.e., encrypted documents. The rights management services also transparently handle key management on behalf of users for shared protected documents. The WINDOWS™ EFS file system can use the RMS infrastructure and its dynamic user access rights functionality to eliminate the need for users, who need to share EFS encrypted files, to exchange encryption certificates.

Extending WINDOWS™ EFS

One aspect of the present novel approach is directed to a method to integrate EFS with RMS to enable users to share EFS encrypted files without having to exchange encryption certificates. The idea behind this approach is to extend EFS to protect and assign FEK user access rights by employing the RMS functionality. User rights to FEKs are derived from files' security descriptor information or as explicitly specified by the "Add Users To Encrypted Files" and "Remove Users From Encrypted Files" APIs. Whenever an encrypted file is created, its FEK is protected using RMS, and the resulting byte stream is stored in the EFS metadata information of the file. When a user subsequently tries to access an encrypted file and doesn't have the FEK needed to decrypt it or the private key needed to access the FEK, the EFS transparently extracts the RMS protected byte stream from the encrypted file EFS metadata information. The EFS then uses RMS to obtain access to the FEK that is stored in the byte stream of the encrypted file metadata information, for the user security context. If the user is authorized access and the FEK is successfully obtained, then EFS is able to decrypt the file data, and the user is granted access to the data. Conversely, if the user doesn't hold rights, i.e., is not authorized, to extract the FEK then the user is denied access to the contents of the encrypted file.

This mechanism enables users to self-recover EFS encrypted files even if the encryption certificate private key is lost. The mechanism also enables users to access encrypted files from multiple computers without having to roam their EFS encryption certificates or manually copy certificate private keys between machines.

As shown in the Figures discussed above, the method extends EFS to utilize RMS to enable the FEKs of the EFS to be protected with RMS. The file security descriptor is used to derive the FEK rights for each user and group. Also, the EFS add and remove user keys APIs are used to manage the access rights on the RMS protected FEK.

Exemplary Computing Device

Figure 6:
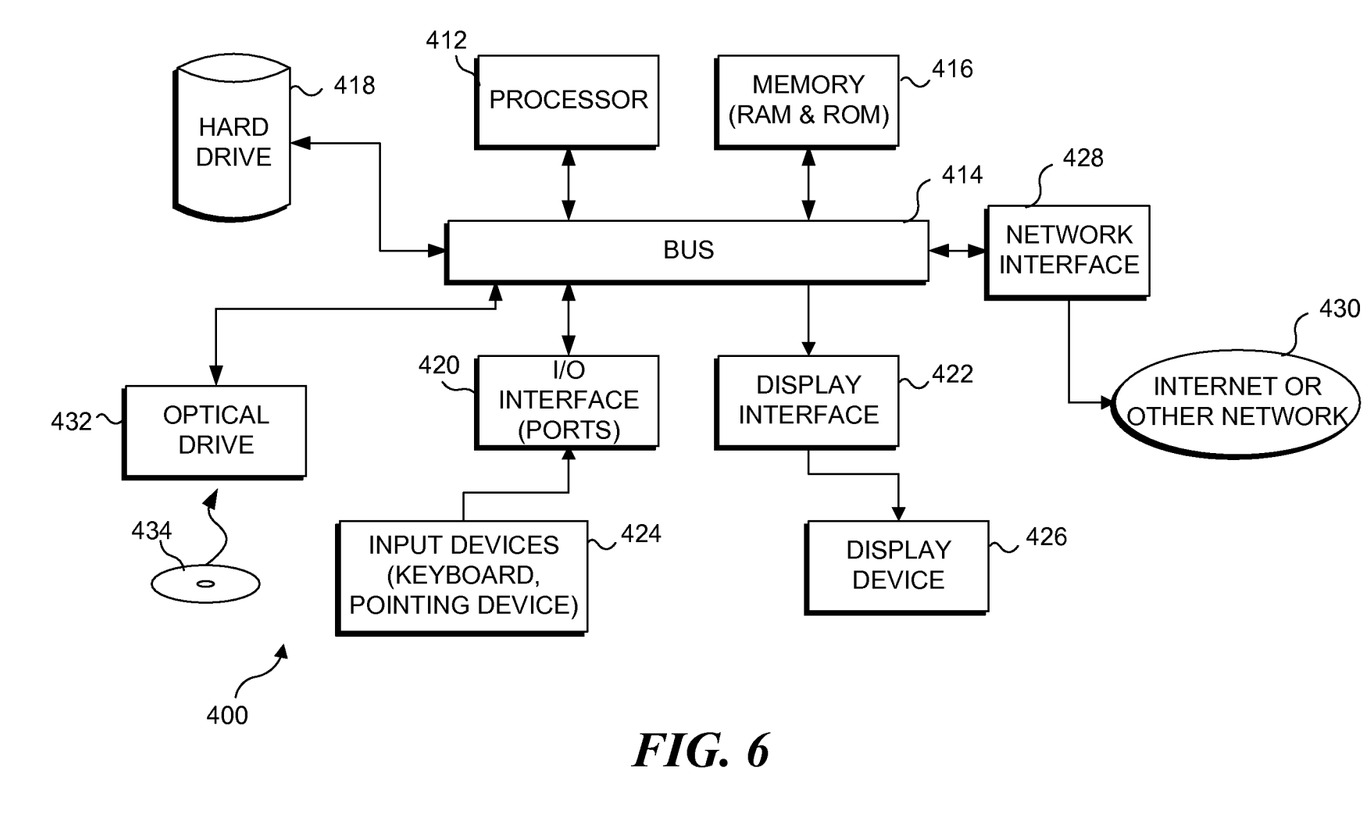
FIG. 6 is a functional block diagram of a generally conventional computing device that can be used for implementing the present novel approach.

FIG. 6 illustrates details of a functional block diagram for a computing device 400 that is useful for performing the functions of the client, or the functions of a network device that implements EFS and RMS in connection with the present novel approach. Computing device 400 can be a typical personal computer of almost any form factor, including a laptop, a desktop, a server, or any other type of general purpose computing device capable of executing a software program to carry out portions of the novel approach described above, but can take other forms such as a logic circuit or a hardwired device that carries out steps of the present novel procedure.

In this exemplary embodiment of a computing device, a processor 412 is employed for executing machine instructions that are stored in a memory 416. The machine instructions may be transferred to memory 416 from a data store 418 over a generally conventional bus 414, or may be provided on some other form of memory media, such as a digital versatile disk (DVD), a compact disk read only memory (CD-ROM), or other non-volatile memory device. An example of such a memory medium is illustrated by a CD-ROM 434. Processor 412, memory 416, and data store 418, which may be one or more hard drive disks or other non-volatile memory, are all connected in communication with each other via bus 414. The machine instructions in the memory are readable by the processor and executed by it to carry out the functions of the exemplary embodiments discussed above. Also connected to the bus may be a network interface 428 to enable communication with a network 430 (or the Internet), an input/output interface 420 (which may include one or more data ports such as any of a serial port, a universal serial bus (USB) port, a Firewire (IEEE 1394) port, a parallel port, a personal system/2 (PS/2) port, etc.), and a display interface or adaptor 422.

Any one or more of a number of different input devices 424 such as a keyboard, mouse or other pointing device, trackball, touch screen input, etc., are connected to I/O interface 420. A monitor or other display device 426 is coupled to display interface 422, so that a user can view graphics and text produced by the computing system as a result of executing the machine instructions, both in regard to an operating system and any applications being executed by the computing system, enabling a user to interact with the system. An optical drive 432 is included for reading (and optionally writing to) CD-ROM 434, or some other form of optical memory medium.

Although the concepts disclosed herein have been described in connection with the preferred form of practicing them and modifications thereto, those of ordinary skill in the art will understand that many other modifications can be made thereto within the scope of the claims that follow. Accordingly, it is not intended that the scope of these concepts in any way be limited by the above description, but instead be determined entirely by reference to the claims that follow.

The invention in which an exclusive right is claimed is defined by the following:

1. A computer-implemented method for managing access to an encrypted file, comprising:
    as implemented by one or more computing devices configured with specific executable instructions,
        (a) in response to a request to encrypt a file that includes information intended to be protected against unauthorized access, encrypting the file with a file encryption key, producing an encrypted file;
        (b) providing the file encryption key and an indication of one or more entities having a right to access the file encryption key to rights management services that are included in an operating system;
        (c) using the rights management services for cryptographically securing the file encryption key, producing a secured file encryption key;
        (d) including the secured file encryption key in a file structure of the encrypted file;
        (e) responding to an entity trying to access the information in the encrypted file, by determining with the rights management services whether the entity is included in the one or more entities that have a right to access the file encryption key, and if so:
            (i) extracting the file encryption key from the secured file encryption key, without requiring that the entity be associated with a key for decrypting the file encryption key; and
            (ii) providing the file encryption key to enable the entity trying to access the information to do so; and
        (f) if the entity is not authorized to access the file encryption key, denying the entity access to the information by not providing the file encryption key to enable the entity to access the information.

2. The computer-implemented method of claim 1, wherein an encrypting file system carries out generating the file encryption key and encrypting the file with the file encryption key.

3. The computer-implemented method of claim 1, wherein providing the rights management services with the indication of the one or more entities having the right to access the file encryption key comprises providing that indication to the rights management services as part of a file security descriptor.

4. The computer-implemented method of claim 1, wherein providing the indication of the one or more entities having the right to access the file encryption key comprises providing the rights management services with an access control list that identifies each entity having the right to access the file encryption key.

5. The computer-implemented method of claim 1, wherein including the secured file encryption key in a file structure of the encrypted file comprises including the secured file encryption key as part of metadata information for the encrypted file.

6. The computer-implemented method of claim 1, wherein an application provides the request to encrypt the information.

7. The computer-implemented method of claim 1, further comprising employing a protected key service for providing the file encryption key to the rights management services to produce the secured file encryption key.

8. The computer-implemented method of claim 1, further comprising caching the file encryption key for the entity attempting to access the information, after the entity has been determined to be allowed access to the information by the rights management services, so that the entity can subsequently access the information in the encrypted file.

9. The computer-implemented method of claim 1, wherein responding to the entity trying to access the information comprises the step of intercepting an open file request by the entity, to open the encrypted file.

10. The computer-implemented method of claim 1, further comprising:
    (a) writing the file encryption key into a memory buffer; and
    (b) protecting the memory buffer with the rights management services using a file security descriptor.

11. The computer-implemented method of claim 1, wherein the secured file encryption key is included in the encrypted file as an extended attribute.

12. The computer-implemented method of claim 1, wherein the secured file encryption key is included in the encrypted file as a special data stream provided by the rights management services.

13. A system for managing access to an encrypted file, comprising:
    (a) a memory in which are stored machine executable instructions; and (b) a processor that is coupled to the memory, the processor executing the machine instructions to carry out a plurality of functions, including:
  (i) encrypting a file that includes information intended to be protected against unauthorized access, using a file encryption key to produce an encrypted file;
  (ii) implementing rights management services included in an operating system defined by the machine executable instructions;
  (iii) providing the file encryption key and an indication of one or more entities having a right to access the file encryption key, to the rights management services;
  (iv) using the rights management services for cryptographically securing the file encryption key, producing a secured file encryption key;
  (v) including the secured file encryption key in a file structure of the encrypted file;
  (vi) responding to an entity trying to access the information in the encrypted file, by determining with the rights management services whether the entity is included in the one or more entities that have a right to access the file encryption key, and if so:
    (1) extracting the file encryption key from the secured file encryption key, without requiring that the entity be associated with a key for decrypting the file encryption key, and
    (2) providing the file encryption key to enable the entity trying to access the information in the encrypted file, to do so; and
  (vii) if the entity is not authorized to access the file encryption key, denying the entity access to the information by not providing the file encryption key to the entity.

14. The system of claim 13, wherein execution of the machine executable instructions further causes the processor to generate the file encryption key.

15. The system of claim 13, wherein the machine executable instructions cause the processor to employ a file security descriptor for determining the one or more entities having the right to access the file encryption key.

16. The system of claim 13, wherein the machine executable instructions cause the processor to employ an access control list for determining the one or more entities having the right to access the file encryption key.

17. The system of claim 13, wherein the machine executable instructions cause the processor to include the secured file encryption key as part of metadata information included in the encrypted file.

18. The system of claim 13, wherein a portion of the machine executable instructions executed by the processor comprise an application program that requests the information be protected in the encrypted file.

19. The system of claim 13, wherein the machine executable instructions cause the processor to implement a protected key service for providing the file encryption key.

20. The system of claim 13, wherein the machine executable instructions cause the processor to cache the file encryption key in a protected portion of the memory, for use by the entity attempting to access the information, after determining that the entity is allowed access to the file encryption key, so that the entity can subsequently access the file encryption key that was cached.

21. The system of claim 13, wherein the machine executable instructions cause the processor to intercept an open file request by the entity attempting to access the file encryption key.

22. The system of claim 13, wherein the machine executable instructions cause the processor to:
  (a) write the file encryption key into a buffer of the memory after it has been generated for use in encrypting the information; and
  (b) protect the buffer using a file security descriptor.

23. The system of claim 13, wherein the machine executable instructions cause the processor to include the secured file encryption key in the encrypted file as an extended attribute.

24. The system of claim 13, wherein the machine executable instructions cause the processor to include the secured file encryption key in the encrypted file as a special data stream provided by the rights management services.

* * * * *